United States Patent [19]

Tworoger et al.

[11] Patent Number: 4,797,055

[45] Date of Patent: Jan. 10, 1989

[54] LOAD MOVING APPARATUS

[75] Inventors: Peter C. Tworoger, Astor; E. A. Johnson, Crescent City, both of Fla.

[73] Assignee: Atlas Marine Technologies, Gibsonburg, Ohio

[21] Appl. No.: 943,568

[22] Filed: Dec. 18, 1986

[51] Int. Cl.⁴ .............................................. B65G 1/06

[52] U.S. Cl. .................................... 414/283; 157/9 E; 212/219; 414/264

[58] Field of Search ............... 414/260, 264, 266, 253, 414/279, 631, 281-283; 187/9 E; 212/219

[56] References Cited

U.S. PATENT DOCUMENTS

| | | | |
|---|---|---|---|
| 2,059,150 | 10/1936 | Schroeder | 187/9 E |
| 3,189,198 | 6/1965 | Filak | 414/283 |
| 3,841,442 | 10/1974 | Erickson et al. | 187/9 E |
| 4,190,013 | 2/1980 | Otis et al. | 414/253 X |
| 4,316,528 | 2/1982 | Dechantsreiter | 414/281 X |
| 4,485,894 | 12/1984 | Soule et al. | 187/9 E |

FOREIGN PATENT DOCUMENTS

| | | | |
|---|---|---|---|
| 1391748 | 2/1965 | France | 414/631 |

*Primary Examiner*—Robert J. Spar
*Assistant Examiner*—David A. Bucci
*Attorney, Agent, or Firm*—James H. Beusse

[57] ABSTRACT

A system for moving objects such as boats to be stored between the water and a storage stall. The system includes a tower assembly, a support assembly and a transport assembly. The tower assembly includes a fork adapted to support and to raise and lower the boat to be moved. The support assembly has an upper base member for supporting the tower assembly, a lower base member, and a motor to cause rotational motion of the upper base member and tower assembly with respect to the lower base member about a vertical axis. The transport assembly includes rails for guiding the support assembly and tower assembly for movement in the horizontal plane.

5 Claims, 6 Drawing Sheets

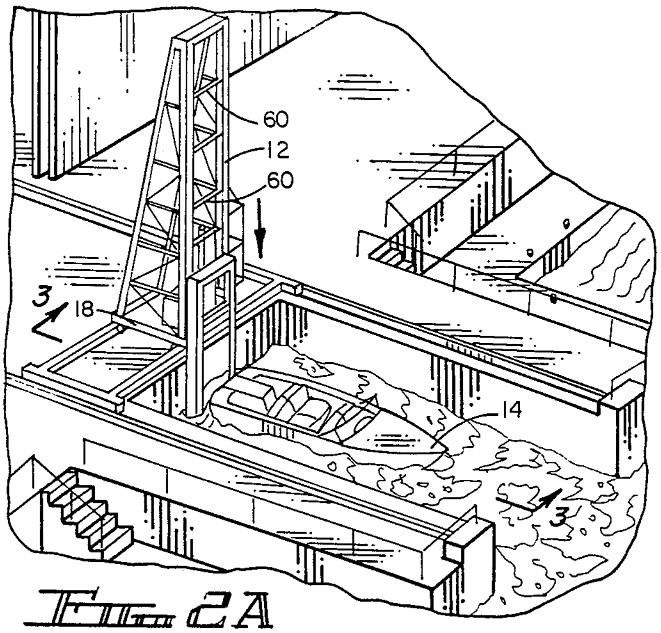
FIG. 2A
FIG. 2B
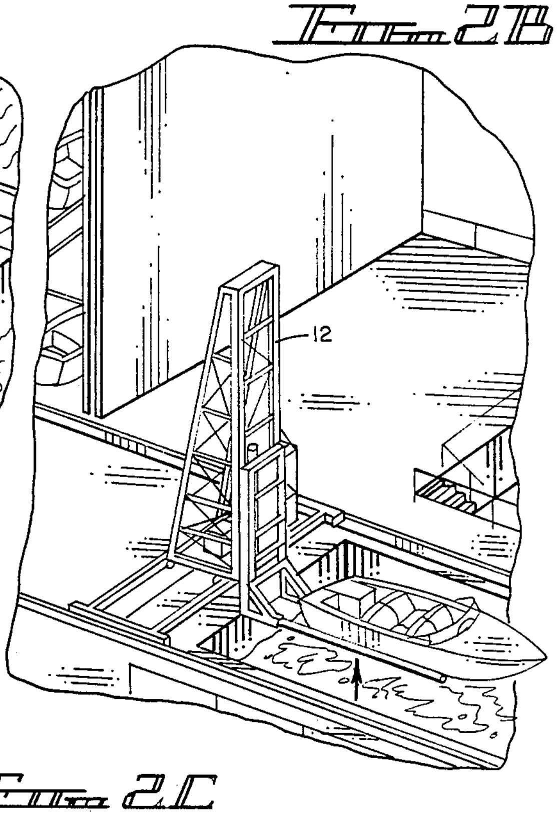
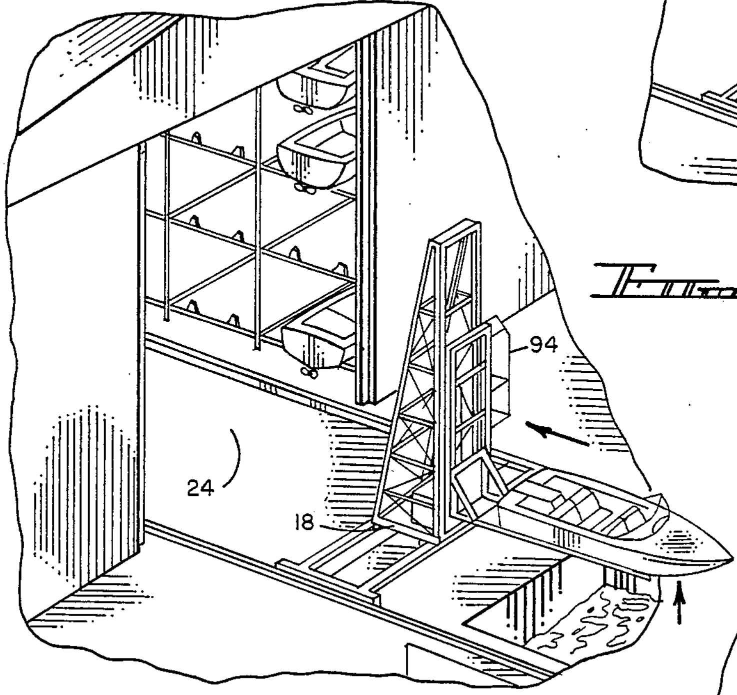
FIG. 2C
FIG. 2E
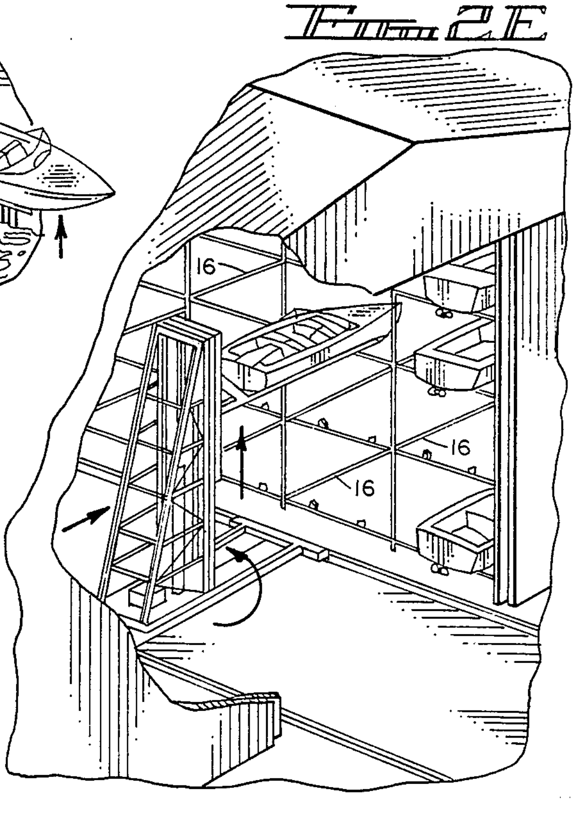
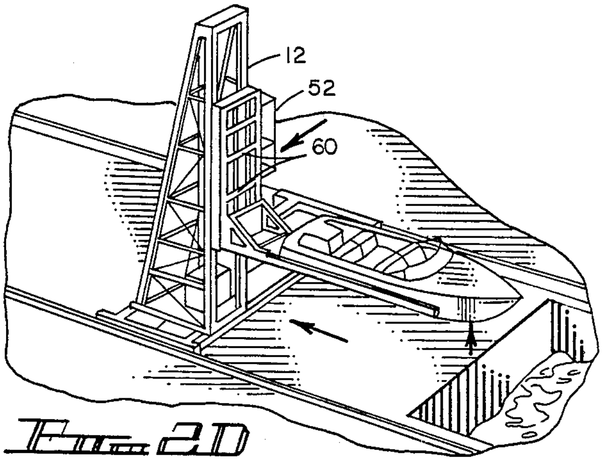
FIG. 2D

LOAD MOVING APPARATUS

BACKGROUND OF THE INVENTION

1. Field of the Invention

The present invention relates to a load moving system and, more particularly, to apparatus for sequentially transporting boats to and from individual stalls arranged in a plurality of columns and rows whereby the boats may be manipulated into and out of the stalls safely, conveniently, economically and in a reduced space.

2. Description of the Prior Art

Small boats are normally stored in dry dock by placing them in stalls constructed of crossed wooden beams or the like. In such storage arrangements, the stalls are located in opposed banks of rows and columns, one bank on each side of a central aisle. The boats are transported into and out of their assigned stalls by means of fork lift trucks or overhead boat moving mechanisms. Note, for example the disclosure in U.S. Pat. No. 3,385,458 to Gresham as well as the disclosures in U.S. Pat. Nos. 3,082,887 to Brooks and 3,786,942 to Dane. Load moving systems are also utilized in environments other than for boat moving and storing. Note the disclosures in U.S. Pat. Nos. 3,513,993 to Lemelson, 3,543,952 to Young and 3,559,822 to Lichtenford.

A disadvantage of such prior art boat moving and storing arrangements is that they normally require that the aisle between the two opposed banks of stalls be excessively wide, usually twice the length of the longest boat to be stored plus the width of the storing or loading apparatus, in order to permit manipulation of a boat to effect inserting or withdrawing of the boat with respect to the stall. It is therefore desirable to improve boat moving apparatus to reduce the width of the required aisle resulting in greater compactness of the boat storage facility or to allow boats of an additional length to be stored in the stalls.

Furthermore, the handling of boats by means of fork lift trucks or overhead apparatus is unsatisfactory due to the fact that the operator must be skilled, with particularly good vision, since he does not always have full visibility of the entire length of a boat being handled and the boat is at varying distances from the operator. There is thus an increased possibility that operator error may occur and result in the striking and damaging of either the storage rack or another boat with the boat which is being handled.

As illustrated by the great number of prior patents and other disclosures, efforts are continuously being made in an attempt to move loads, such as boats, more efficiently. None of these disclosures suggest the present inventive system or combination of elements for moving loads as herein described and claimed. These prior disclosures do not provide for the safe, convenient, economical and compacted movement of loads as occurs with the apparatus of the present invention. The present invention achieves its purposes, objectives and advantages over the prior art through new, useful and unobvious apparatus which consistently insures efficient load movement through the use of a minimum number of functioning parts, at a reduction in cost, and through the utilization of only readily available materials and conventional components.

These objects and advantages should be construed as merely illustrative of some of the more prominent features and applications of the present invention. Many other beneficial results can be attained by applying the disclosed invention in a different manner or by modifying the invention within the scope of the disclosure. Accordingly, other objects and advantages as well as a fuller understanding of the invention may be had by referring to the summary of the invention and detailed description describing the preferred embodiment of the invention in addition to the scope of the invention as defined by the claims taken in conjunction with the accompanying drawings.

SUMMARY OF THE INVENTION

The present invention is defined by the appended claims with the specific preferred embodiment shown in the attached drawings. For the purposes of summarizing the invention, the invention may be incorporated into a system for moving objects between positions. The system includes a tower assembly adapted to support and to raise and lower an object to be moved. The system also includes a support assembly having an upper base member for supporting the tower assembly, a lower base member, and motor means to cause rotational motion of the upper base member and tower assembly with respect to the lower base member about a vertical axis. The system also includes a transport assembly including means for guiding the support assembly and tower assembly for linear movement in the horizontal plane.

The tower assembly includes a tower, a guide movable with respect to the tower, and a fork for supporting the object and movable with respect to the guide. The tower assembly also includes first means coupling the tower and guide to cause relative motion therebetween. The tower assembly also includes second means coupling the guide and the fork to cause relative motion therebetween. The movement of the fork with respect to the guide is responsive to the movement of the first means. Movement of the second means is initiated after a predetermined movement of the guide with respect to the tower. The transport assembly includes transverse rails for guiding the support assembly and tower assembly for movement in a transverse direction. The transport assembly also including longitudinal rails for guiding the transverse rails, support assembly and tower assembly for movement in a longitudinal direction. The system further includes an operator cage movable between a raised position and a lowered position responsive to the raising and lowering of the object by the tower assembly. The system further includes elongated, rotatable control means positioned to extend vertically between the cage and the tower assembly with handles movable with the cage for effecting the rotation of the control means from any one of a plurality of positions of elevation of the cage and handles.

The invention may also be incorporated into an assembly for effecting relative motion between a first position and a second position. The assembly includes a fixed member and a movable member being adapted to move linearly with respect to the fixed member. The assembly also includes control means with elongated, rotatable rods having their ends positioned adjacent the fixed member. The assembly also includes handles movable with respect to the rods and the fixed member for effecting the rotation of the control means from any one of a plurality of positions of the movable member with respect to the fixed member.

In addition, the invention may also be incorporated into a lifting assembly for moving a load between a lower position and a higher position. The lifting assembly includes a tower and a fork. The fork is adapted to support the load for motion in a path of travel upwardly and downwardly with respect to the tower. The motion imparting means includes an intermediate guide between the fork and the tower adapted to raise and lower the fork with respect to both the tower and the guide and also adapted to raise and lower the guide with respect to the tower. The motion imparting means also includes a lift cylinder adapted to move at a first speed to raise the guide at a second speed faster than the first speed. The motion imparting means also includes means responsive to the movement of the guide to move the fork at a third speed faster than the second speed. The motion imparting means also includes means to move the guide and fork simultaneously during the lower portion of the path of travel. The motion imparting means also includes means to move the fork relative to the guide during the upper portion of the path of travel. The lifting assembly further includes a cage for an operator. The cage is movable linearly between upper and lower positions and is responsive to the lifting and lowering of the fork. The lifting assembly further includes control means formed as elongated, rotatable rods located in a fixed orientation between the cage and the tower. The control means include handle means movable with the movement of the cage with the handle means adapted to effect the rotation of the control means from any one of a plurality of positions of elevation of the cage and handle means. The assembly further includes support means for the assembly. The support means are adapted to effect the rotation of the assembly about a vertical axis. The assembly further includes rails for supporting the assembly and support means for horizontal movement in a first direction. The assembly further includes additional rails for supporting the assembly, support means and first mentioned rails for horizontal movement in a second direction, transverse to the first mentioned direction. The face of the tower supporting the guide and the fork tilts rearwardly so that the fork and guide move toward the vertical centerline of the tower as they move upwardly along the path of travel.

Lastly, the invention may also be incorporated into apparatus for moving an object along a path of movement between a fixed first position and a variable second position. The apparatus includes a tower and a fork. The fork is adapted to support the object and to move along the path of movement between the first and second positions. The apparatus also includes an intermediate guide between the fork and the tower, a lift cylinder having a piston, first pulley means located upon the piston for movement therewith, first cable means positioned around the first pulley means coupling the guide with a fixed reference point, second pulley means located upon the guide for movement therewith, and second cable means positioned around the second pulley means coupling the fork and a second reference point. The movement of the piston of the cylinder will move the guide with respect to the tower. The movement of the guide may move the fork with respect to the guide. The apparatus further includes a rack fixed with respect to the tower and a grounding bar slidably secured with respect to the rack. The second cable means is secured to the grounding bar to allow the fork, guide and rack to move together for a first portion of the path of movement and to allow the grounding bar to become fixed with respect to the rack and tower for the second portion of the path of movement. The fork may thus move with respect to the guide.

The foregoing has outlined rather broadly the more pertinent and important features of the present invention in order that the detailed description of the invention that follows may be better understood whereby the present contribution to the art can be more fully appreciated. Additional features of the invention will be described hereinafter which form the subject of the claims of the present invention. It should be appreciated by those skilled in the art that the conception and the specific embodiment disclosed herein may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the nature, objects and advantages of the present invention, reference should be had to the following detailed description taken in conjunction with the accompanying drawings in which:

FIGS. 2A–2E illustrate operation of the inventive system in lifting, transporting and storing a boat;

DETAILED DESCRIPTION OF THE INVENTION

Figure 1:
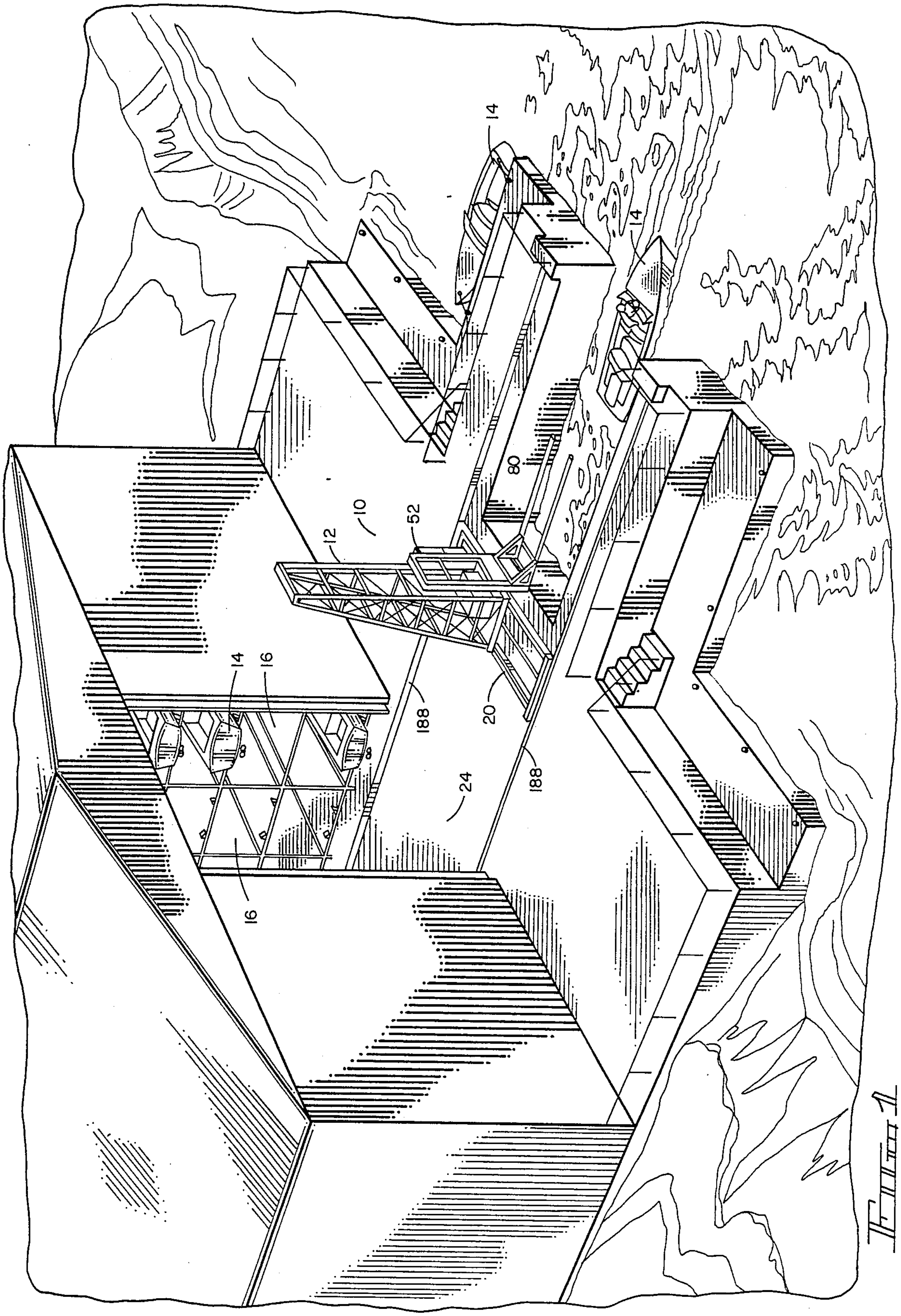
FIG. 1 is a perspective illustration of the load moving system of the present invention showing the tower assembly, support assembly and the transport assembly and also showing the boat to be moved in a lower position as well as the boat stalls.

As shown in the Figures, with particular reference to FIGS. 1 and 2, the lifting system 10 of the present invention includes a tower assembly 12 for raising and lowering objects, shown in the preferred embodiment as boats 14, into stalls 16. The lifting system also includes a support assembly 18 upon which the tower assembly 12 rests and for imparting rotational motion thereto. The lifting system 10 also includes a transport assembly 20 for moving and positioning the tower assembly 12 and support assembly 18. The coordinated movement of the various assemblies allows for the convenient movement of boats sequentially between the water and predetermined stalls from the plurality of stalls arranged in rows and columns. The compactness of the system permits a narrower aisle 24, reduced, for example, from a standard 48 feet to 36 feet or, in the alternative, the storage of boats up to six feet longer than was previously possible. Furthermore, while illustrated as being installed on a slab construction, it will be apparent that the system can be installed on pilings or on a bridge structure extending over water or marshy ground.

The tower assembly, as particularly seen in FIG. 1 and FIGS. 4A-4D and 3, includes a generally vertically extending tower 26 with channel iron 28 and angle iron 30 extending from an upper base plate 32 at the bottom 34 of the tower to the top 36 of the tower. Various horizontal cross braces 38 and diagonal cross braces 40 provide rigidity to the structure. The channel iron is fabricated into a rectangular configuration to form front and back faces 44 and 46 which slope toward each other terminating at an apex at the top, 36 of the tower assembly. The sloping of the faces allows the center of gravity of the load to move closer to the vertical centerline of the tower during lifting for increased stability of the system. The channel iron on the front face is provided with inwardly directed guide rails 48 adapted to support and guide four rollers 50, two secured to each side of the intermediate member or guide 52. Transverse struts 54 and 56 at the upper and lower ends of the guide rails 48 limit the operable extent of the rollers 50 and guide 52.

The guide 52 is of a height substantially half the height of the tower 26. It is formed of channel iron 58 fabricated into a rectangular configuration and is provided with horizontal cross braces 60 to provide rigidity. The rollers 50 of the guide 52 are journaled for rotation on interiorly extending brackets 62, two rollers adjacent the top of the guide and two rollers adjacent a central extent of the guide. With the rollers extending interiorly of the guide, the guide may extend exteriorly of the front face 44 of the tower with the rollers extending outwardly into the guide rails 48 of the channel iron on the front face of the tower for linear, reciprocal motion generally vertically with respect thereto. The vertical channel iron 58 of the guide is formed with inwardly extending guide rails 66 for reciprocally supporting the four rollers 68 of the fork 70. Upper and a lower horizontal cross braces 72 and 74 terminate the operable extent of the guide rails 66. In addition, two idler pulleys 76 are secured to the top horizontal cross brace or strut 72 for effecting motion of the guide and fork with respect to the tower as will be described hereinafter.

Figure 3:
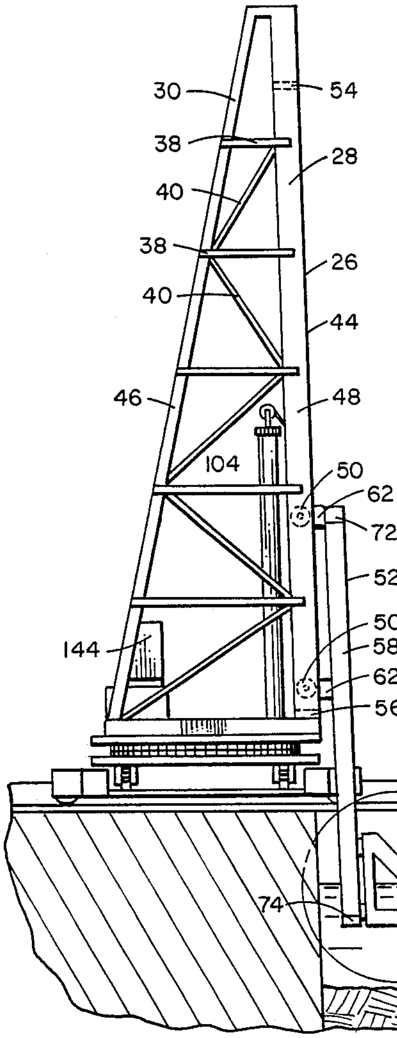
FIG. 3 is a side view with partial cutaway showing the system in position for lifting a boat.
Figure 3:
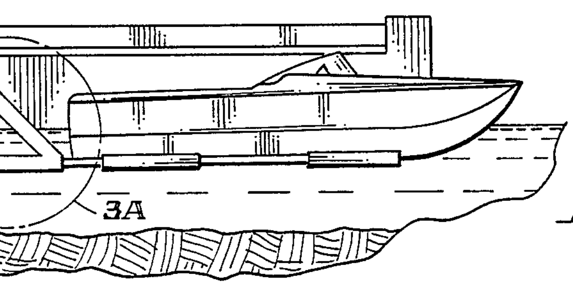
Figure 3A:
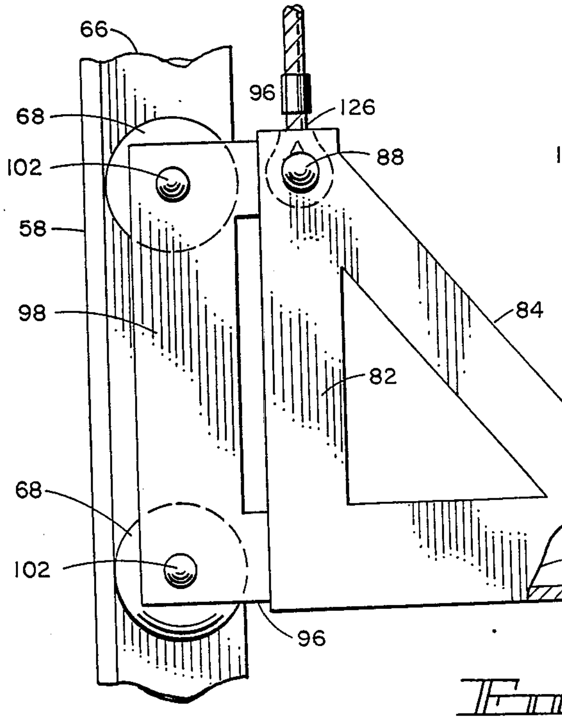
FIG. 3A is an enlarged drawing of the section indicated by line 3A in FIG. 3.
Figure 3A:
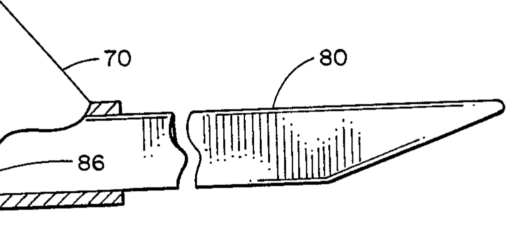

With reference to FIGS. 3 and 3A, the fork 70 includes parallel fingers 80 extending exteriorly from the tower and guide. The fingers are rectangular in cross-section and are canted inwardly at their upper edges so as to provide angled upper surfaces which may contact and conform with the bottom surface of a boat to be lifted and moved. The fork also includes vertically extending supports 82, the upper edges of which support diagonal struts 84 to provide strength to the fingers during operation and use. The lower edges of the supports have recesses 86 for removably receiving the fingers 80. Fingers of varying lengths and configurations may thus be employed. A dowel 88 is located through the upper edges of the vertical supports and diagonal struts. The dowel has an extension 90 projecting from one side thereof for providing motion to the operator cage 94 as will be described hereinafter. The dowel also supports interiorly extending horizontal brackets 96 with interiorly extending vertical struts 98 adapted to support shafts 102 upon which the four rollers 68 of the fork are journaled for rotation. The lower ends of the vertical struts 98 pivot freely and bear against the lower portion of the vertical supports 82. The fork rollers 68 extend outwardly of the fork assembly and are positionable in the guide rails 66 of the channel irons which constitute the sides for the guide. In this manner, motion can be imparted to the fork for movement up and down the guide during operation and use.

Figure 4A:
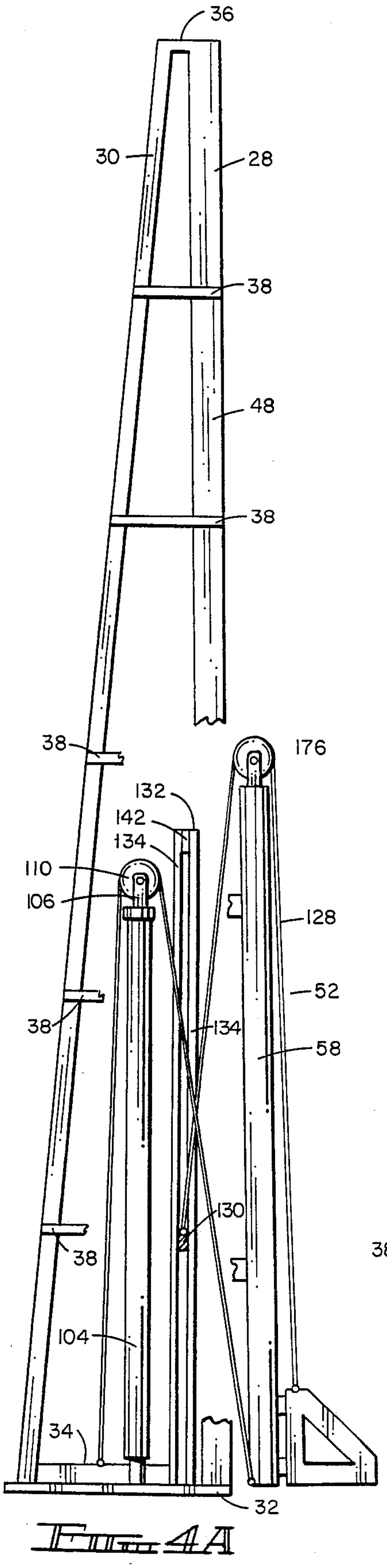
FIGS. 4A–4C illustrate the tower assembly and operation thereof at various lifting positions.
Figure 4B:
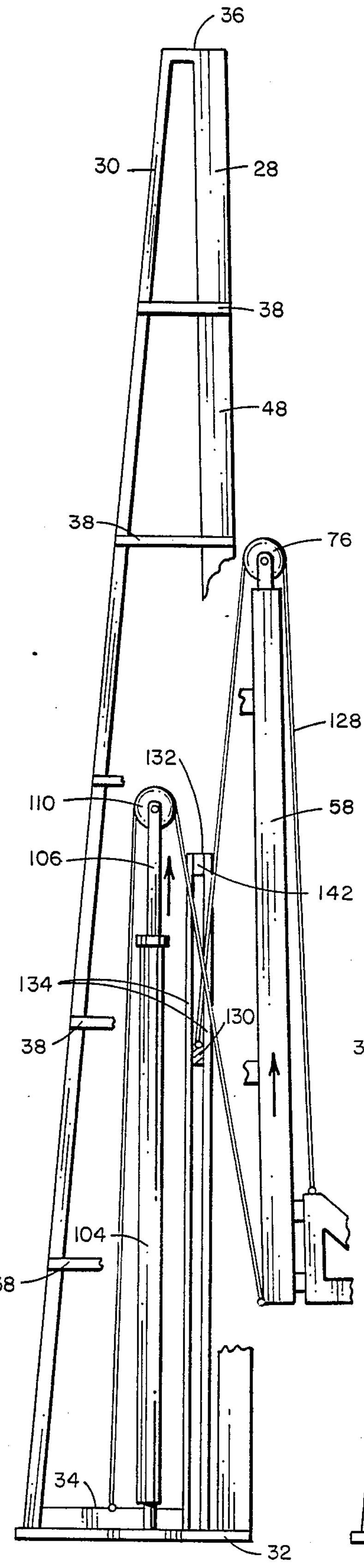
Figure 4C:
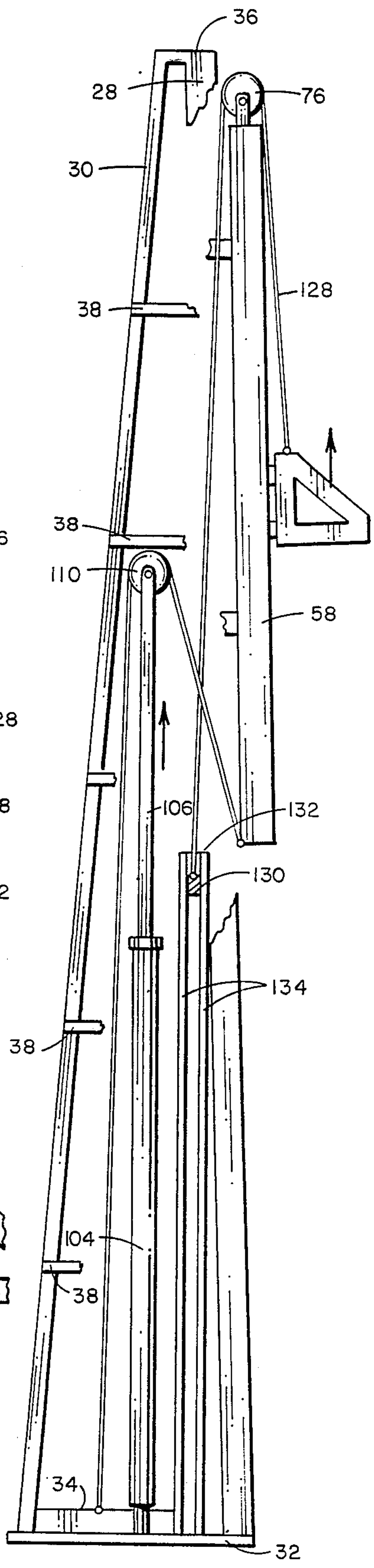
Figure 4D:
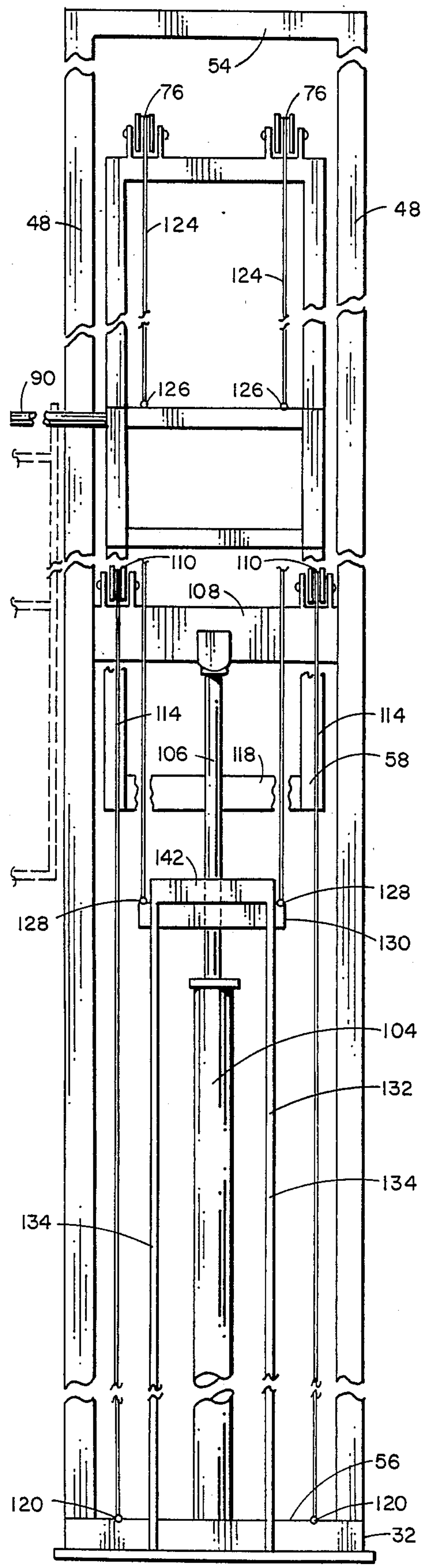
FIG. 4D is a frontal view in partial cutaway of the tower assembly shown in FIG. 4C.

As can be seen in FIGS. 4A–4D, motion is imparted to the guide and fork by a lift cylinder 104, preferably hydraulic, located within the tower assembly. The lower portion of the lift cylinder is secured to the base plate 32 and is thereby fixedly positioned with respect to the tower. The reciprocating piston 106 of the cylinder has a plate 108 at its upper end supporting primary idler pulleys 110. Motion is imparted to the piston as through an internal combustion motor and hydraulic pump (not shown). Primary cables 114 extend around the primary pulleys 110 having their first ends secured to a horizontal strut 118 of the guide 52 and having their second ends 120 secured to the base plate 32. When the piston rod is fully retracted, the lower end of the guide extends to its lowermost position, shown in FIG. 2A as below the tower and base plate, for receiving an object to be lifted. In this orientation, the lower rollers of the guide rest on the lower horizontal cross brace 56 of the guide rails 48 of the tower. This orientation is effected since a substantial distance of the guide extends beneath its lower rollers. When the piston is extended a predetermined extent, as shown in FIGS. 4A and 2C, the lower edges of the fork and guide are jointly raised a predetermined distance, shown as even with the level of the base plate. As the piston continues to extend beyond this location, a compound motion is imparted to the fork.

The compound motion of the fork is achieved by virtue of the secondary idler pulleys 76 journaled to the upper edge of the guide 52. Secondary cables 124 extend over the secondary idler pulleys and have first ends 126 secured to the dowel 88 and have their second ends 128 secured to a slidable grounding bar 130 mounted for reciprocation along a guide rack 132 shown in FIG. 4D. The guide rack is a member formed of flat bars creating a pair of guide rails 134 fixedly secured in the lower half of the tower 28 parallel with the guide 52. The rack 132 has generally vertical guide rails 134 for receiving and guiding the grounding bar 130. Horizontal strut 142 provides rigidity to the guide rack and defines the upper limit of motion of the grounding bar. Consequently, during the initial movement of the piston 106 from the fully retracted position, the fork 70 moves upwardly with the guide 52, being directly lifted thereby, at an intermediate speed. Because of the pulley and cable arrangement, the fork and guide move at twice the speed of the piston pulley 110. During this motion, the secondary cables 124 extend in an orientation draped non-rotatably about the second idler pulleys 76. When, however, the piston causes the fork and guide to pass a predetermined distance above the base plate 32 of the tower, the grounding bar 130 contacts the uppermost strut 142 of the rack to thereby stop motion of bar 130. Thereafter, the guide continues at its previous rate of motion. The fork, however, now begins to travel upwardly along the moving guide at twice the speed of the guide because of the arrangement of the secondary cable 128 and pulley 76. The rate of motion of the fork along its extended, upward motion is thus four times the speed of the piston 106.

In the preferred embodiment of the invention, the guide is positioned with the fork nine feet beneath the tower when the piston is fully retracted. In this orientation, a boat to be lifted may be moved over the fingers into a position to be lifted. The piston is then extended for lifting the boat for movement into a proper rack or stall 16 at a remote location. During the first four and a half feet of extension of the piston 106, the guide 52, fork 70 and boat 14 move upwardly together for nine feet, at an intermediate speed, twice the speed of the piston. During the remaining, continuing upward motion of the guide, fork and boat, the piston continues to extend an additional seven and a half feet, causing the primary cables 114 and pulleys 110 to lift the guide 52 an additional 15 feet. During this continued upward movement, the grounding bar 130 has contacted the upper strut 142 of the rack 132 and has become immovable. Because of this arrangement of the secondary cables and pulleys, the fork 70 begins to move upwardly along the guide 52 at twice the speed of the guide. Consequently, the fork and boat move up the guide at four times the speed of the piston. This motion of the fork and boat may continue for 30 feet in addition to the initial nine feet at the intermediate speed for a total lift of 39 feet. This motion is reversed for moving a boat from a stall to the water or for returning the empty fork to the water for moving another boat.

Located to one side of the tower assembly is the operator supporting member or cage 94 provided with idler rollers 148 receivable in channel iron formed as guide rails 150 along one vertically extending side of the tower. Note, in particular, FIGS. 2, 8 and 9. The cage includes a platform 152 upon which an operator may stand and upwardly extending side walls 154 for safety purposes. Upwardly extending from the upper portion of the cage are hooks 158 extending forwardly of the cage. The hooks are adapted to receive and be lifted by the above-described outward extension 90 of the dowel 88 of the fork 70. The downward motion of the cage is arrested at ground level by the cage resting upon the upper base plate 32. The cage, however, will rise with the fork after the fork has risen above the cage and the dowel extension engages and lifts the hooks of the cage as well as the cage itself. With the proper configuration and design as shown, the operator will continuously be in a position to view the bottom of the boat from a common distance during its movement to a proper location. Once the cage has begun to move, it will always be maintained at this predetermined distance from the bottom of the fork lift and boat until the fork returns the carriage to ground level.

Figure 10:
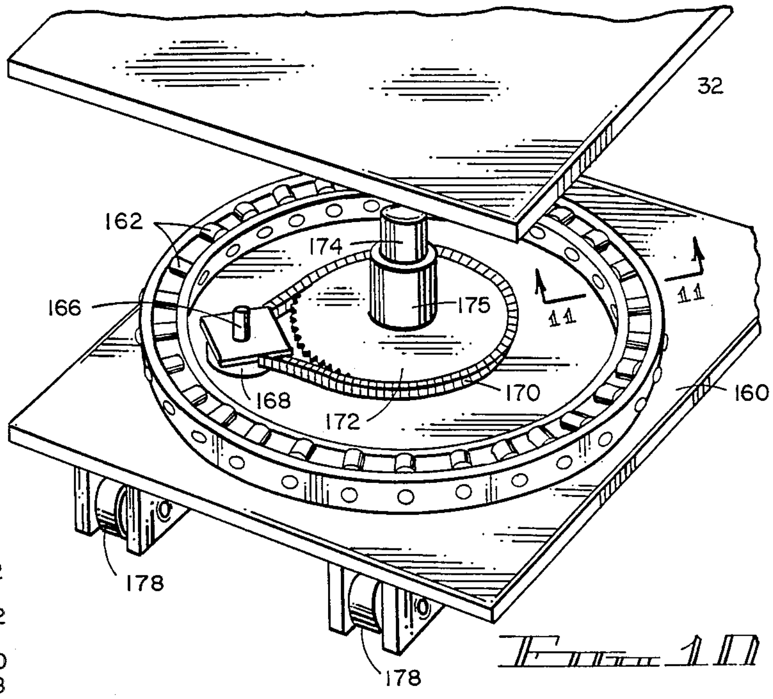
FIG. 10 is a partial exploded view of the tower rotational drive system.
Figure 11:
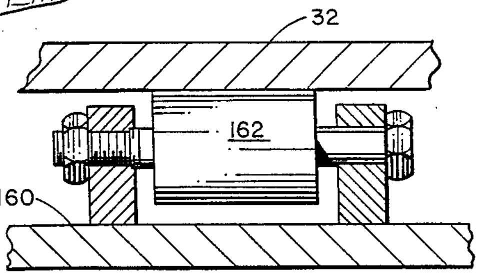
FIG. 11 is a view along lines 11—11 of FIG. 10.

Referring now to FIGS. 10 and 11, the tower is positioned on the support assembly by an upper or primary base plate 32 which is movable about the vertical axis for 360 degree rotation in either direction. A lower base plate 160 is also provided and has an upper surface with idler rollers 162 in a circular configuration to facilitate the rotation of the upper base plate and tower. A motor 144 (see FIG. 3) attached to the upper surface of plate 32 has a shaft 166 extending through plate 32 and coupled to a rotatable gear 168 located between the plates 32 and 160. A chain 170 couples gear 168 to a larger gear 172. The larger gear is fixedly mounted on a nonrotating shaft 174. The plate 32 has a central aperture through which shaft 174 protrudes. A bearing 175 fits within the aperture and around shaft 174 to allow plate 32 to rotate about the fixed shaft. As the shaft 166 rotates, it drives gear 168 causing gear 168 to "walk" around fixed (nonrotating) gear 172. The shaft 166 passing through plate 32 provides the driving force to rotate plate 32.

Figure 5:
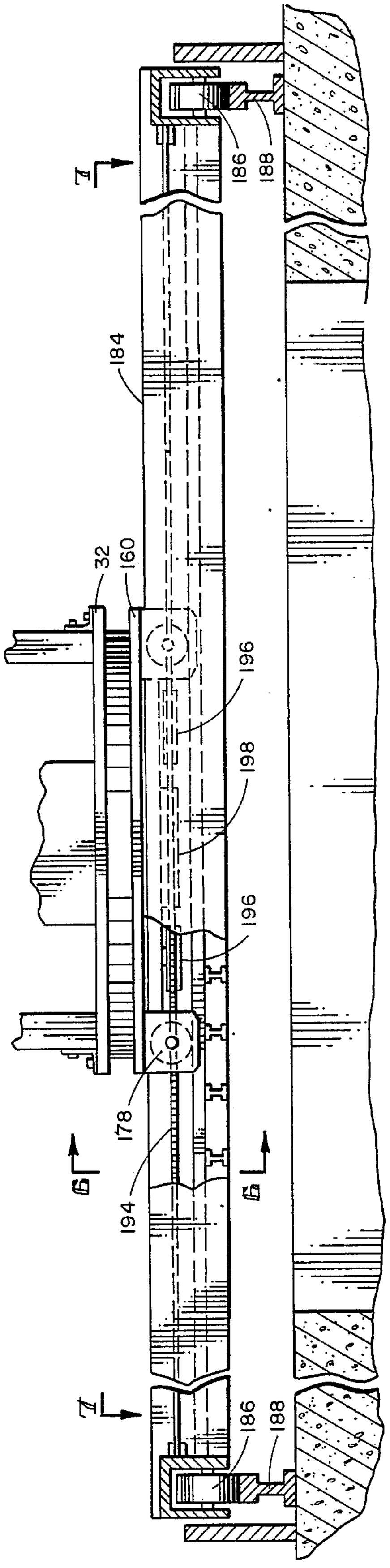
FIG. 5 is a cross-sectional view illustrating the tower support and transport mechanism.
Figure 6:
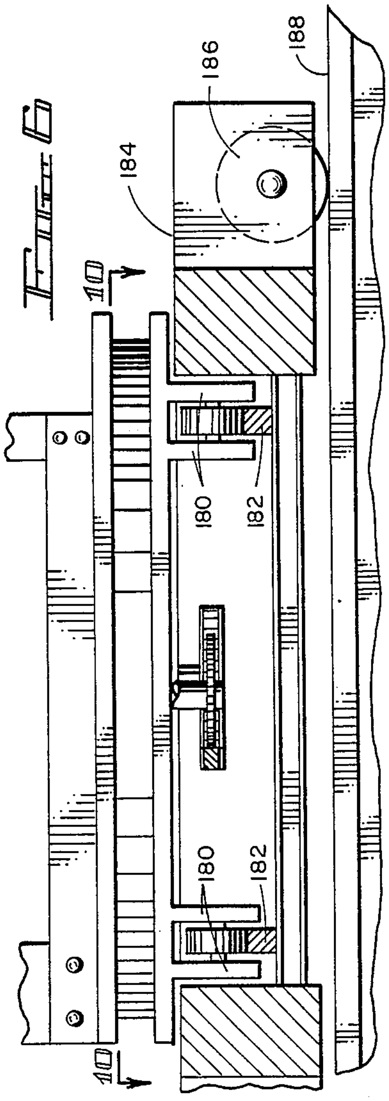
FIG. 6 is a sectional view along lines 6—6 of FIG. 5.

The lower face of the lower base plate is provided with secondary rollers 178 at each corner receivable in channels formed by guide bars 180. The rollers ride on secondary or transverse rails 182. Note FIGS. 5 and 6. In this manner, the support assembly and tower assembly may move transversely along the length of the secondary rails 182 or from edge to edge of the aisle 24 and pier upon which the lifting system may be employed. These rails are, in turn, supported upon a base structure 184, the corners of which each support primary longitudinal rollers 186 for effecting the linear motion of the entire lifting system along the primary or longitudinal rails 188, extending between the boat storage area and the end of the pier. (Note the extension of rails 188 beyond the water edge in FIG. 1).

Figure 7:
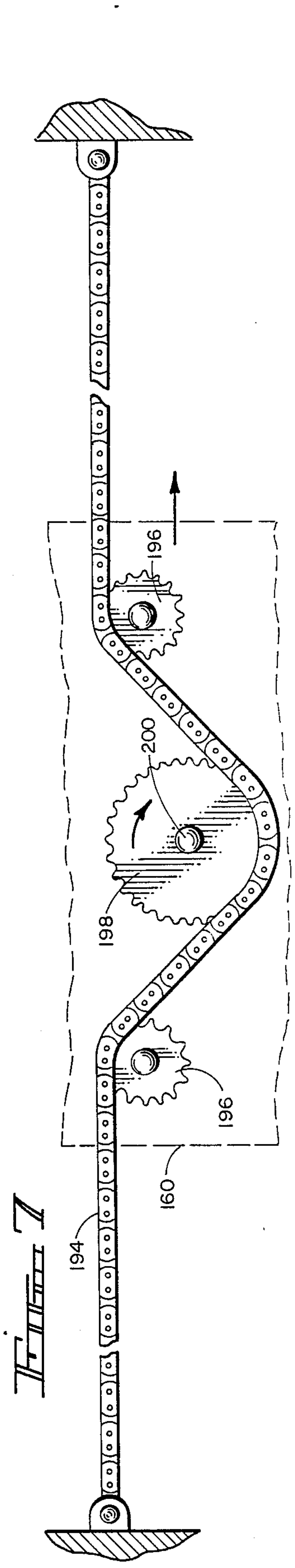
FIG. 7 is an illustration of one form of drive mechanism for the tower support.

Appropriate motors, either electric or hydraulic, are associated with the transport assembly 20 to provide lateral as well as longitudinal motion of the transport assembly and tower assembly with respect to the rails of the transport assembly. Such motors are well known and are omitted for simplicity. Referring to FIG. 7, it is preferred that the transverse motion of the base assembly be effected through a chain 194 extending parallel with the rails 182 and looped through idler sprockets 196 and an intermediate drive gear 198 within the transport assembly. A motor (not shown) attached to plate 160 has a shaft 200 coupled to drive gear 198 to effect the desired transverse motion of the base assembly along the secondary rails. The primary or longitudinal drive rollers 186 are preferably driven directly by a drive motor (not shown) connected in driving relationship to the rollers. It should be understood that either assembly of the drive rollers may be driven by the same or different types of motors as is well known in the art.

Figure 8:
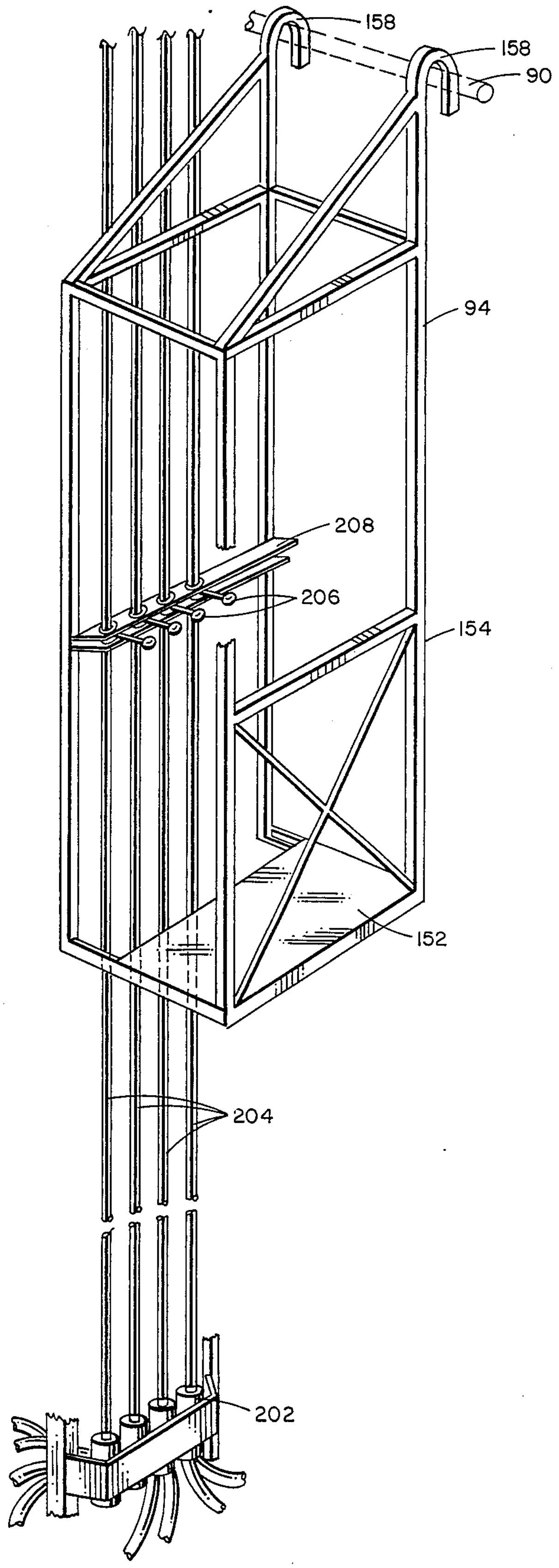
FIG. 8 is an illustration of an operator's cage and the arrangement of transport system controls.
Figure 9:
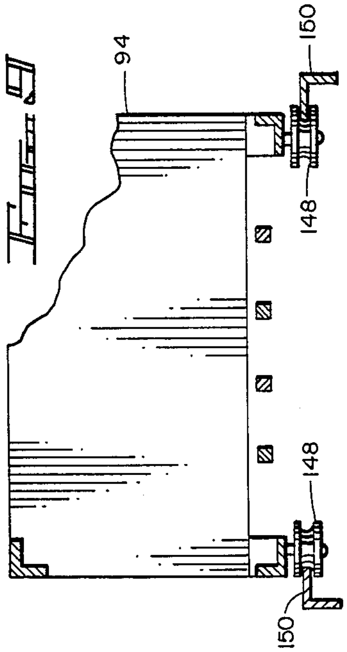
FIG. 9 is an end view of the operator's cage showing the mounting to the tower assembly.

As shown in FIG. 8, appropriate valves and controls 202 for the various motors for effecting the various motions of the system are fixedly positioned in the support assembly 18 between the operator cage 94 and the adjacent side of the tower assembly 12. The valves and controls being fixed reduces the chance of inadvertent contact and damage by moving parts. The control mechanisms are manipulated by elongated control rods 204 which extend the full height of the tower assembly. Each of the rods preferably has a rectangular cross sectional configuration. Grips or handles 206 for the control rods are slidably secured to the operator cage for movement along the rods 204 as the cage moves up and down the tower assembly. Apertured plates 208 secured to the cage above and below the handles allow the handles to remain at a fixed distance from the floor of the cage for operator convenience. In this way the rectangular rods 204 may be rotated regardless of the position of the operator and cage. In the preferred embodiment as shown, four such rods and controls are utilized, one for up and down, one for rotation, one for longitudinal movement and one for transverse movement. As can be easily understood, the entire system is readily adaptable for computerized control. In the preferred embodiment, the valves 202 are hydraulic valves for controlling the piston 104 and appropriate hydraulic motors for positioning and moving the tower assembly.

The present disclosure includes that information contained in the appended claims as well as that in the foregoing description. Although the invention has been described in its preferred form or embodiment with a certain degree of particularity, it is understood that the present disclosure of the preferred form has been made only by way of example and that numerous changes in the details of construction, fabrication and use, including the combination and arrangement of component elements and assemblies, may be resorted to without departing from the spirit and scope of the invention.

We claim:

1. A boat handling system for lifting, transporting and storing boats in a cellular storage facility, the storage facility having an access aisle parallel to a plurality of rows and columns of boat receiving stalls, the system comprising:

a first set of rails extending the length of the aisle and continuing to a boat loading location;

a base structure having rollers positioned to ride on the first set of rails for effecting movement of the base structure along the rails;

a second set of rails attached to the base structure for movement therewith, the second set of rails being oriented orthogonally to the first set of rails;

a support assembly having rollers positioned to ride on the second set of rails for effecting movement of the support assembly thereon, the support assembly including a lower base plate to which the support assembly rollers are coupled and an upper base plate rotatably coupled to the lower base plate for rotation about a vertical axis therethrough;

a tower assembly mounted on the upper base plate, the tower assembly including a vertically extending tower, a guide slidably coupled to the tower for vertical motion therealong, and a fork slidably coupled to the guide for vertical motion therealong, the fork being adapted for supporting a boat; and means coupled to the tower assembly for effecting movement of the guide and the fork for raising and lowering the fork to selected positions and for moving the tower assembly along the first and second sets of rails for transporting boats between selected ones of the stalls and the loading location comprising:

(i) a hydraulic cylinder having a pistion vertically extendible along the tower assembly;

(ii) a first pulley attached to an end of the piston for movement therewith;

(iii) a first cable having one end attached to the support assembly and a second end attached to the guide, the cable passing over the pulley whereby movement of the piston affects motion of the guide;

(iv) a second pulley attached to the guide for movement therewith; and (v) a second cable having one end attached to the fork and a second end attached to a variable position stop, the second cable passing over the second pulley whereby motion of the guide effects extension of the second cable until the second end thereof reaches the stop and thereafter effects motion of the fork along the guide.

2. A system for lifting, transporting and storing boats comprising:

a tower assembly adapted to support and to raise and lower a boat to be transported, the tower assembly including a tower, a guide movable with respect to the tower and a fork for supporting the boat and movable with respect to the guide, the tower assembly including first means coupling the tower and guide to cause relative motion therebetween, and second means coupling the guide and the fork to cause relative motion therebetween, the movement of the fork with respect to the guide being responsive to the movement of the first means;

a support assembly having an upper base member for supporting the tower assembly, a lower base member, and means for effecting rotational motion of the upper base member and tower assembly with respect to the lower base member about a vertical axis thereof;

a transport assembly including means for guiding the support assembly and tower assembly for linear movement in two orthogonal directions in a horizontal plane;

an operator cage coupled to the tower assembly for movement therewith, the cage being slidably coupled for vertical motion along the tower assembly, and means responsive to motion of the fork for raising and lowering the cage to maintain selected positions of the cage with respect to a boat being transported; and elongated, rotatable control means positioned to extend vertically between the cage and the tower assembly with handles movable with the cage for effecting the rotation of the control means from any one of a plurality of positions of elevation of the cage and handles.

3. A lifting assembly for moving a load between a lower position and a higher position including:

a tower and a fork, the fork adapted to support the load for motion in a path of travel upwardly and downwardly with respect to the tower, and motion imparting means which includes an intermediate guide betweem the fork and the tower adapted to raise and lower the fork with respect to both the tower and the guide and also adapted to raise and lower the guide with respect to the tower;

a cage for an operator, the cage being movable linearly between upper and lower positions and responsive to the lifting and lowering of the fork; and control means formed as elongated, rotatable rods located in a fixed orientation between the cage and the tower, the control means including handle means movable with the movement of the cage, the handle means being adapted to effect the rotation of the control means from any one of a plurality of positions of elevation of the cage and handle means.

4. Apparatus for moving a boat along a path of movement between a fixed first position and a variable second position, the apparatus including a tower and fork, the fork being adapted to support the boat and to move along the path of movement between the first and second positions, an intermediate guide between the fork and the tower, a lift cylinder having a piston, first pulley means located upon the piston for movement therewith, first cable means positioned around the first pulley means and coupling the guide with a fixed reference point, second pulley means located upon the guide for movement therewith, second cable means positioned around the second pulley means and coupling means the fork and a second reference point whereby movement of the piston of the cylinder will move the guide with respect to the tower and whereby movement of the guide may move the fork with respect to the guide, the apparatus further including a rack fixed with respect to the tower, a grounding bar slidably secured with respect to the rack, the second cable means being secures to the grounding bar allow the fork, guide and rack to move together for a first portion of the path of movement and to allow the grounding bar to become fixed with respect to the rack and tower for the second portion of the path of movement so that the fork may move with respect to the guide.

5. A boat handling system for lifting, transporting and storing boats in a cellular storage facility, the storage facility having an access aisle parallel to a plurality of rows and columns of boat receiving stalls, the system comprising:

a first set of rails extending the length of the aisle and continuing to a boat loading location;

a base structure having rollers positioned to ride on the first set of rails for effecting movement of the base structure along the rails;

a second set of rails attached to the base structure for movement therewith, the second set of rails being oriented orthogonally to the first set of rails;

a support assembly having rollers positioned to ride on the second set of rails for effecting movement of the support assembly thereon, the support assembly including a lower base plate to which the support assembly rollers are coupled and an upper base plate rotatably coupled to the lower base plate for rotataion about a vertical axis therethrough;

a tower assembly mounted on the upper base plate, the tower assembly including a vertically extending tower, a guide slidably coupled to the tower for vertical motion therealong, and a fork slidably coupled to the guide for vertical motion therealong, the fork being adapted for supporting a boat;

means coupled to the tower assembly for effecting movement of the guide and the fork for raising and lowering the fork to selected positions and for moving the tower assembly along the first and second sets of rails for transporting boats between selected ones of the stalls and the loading location, said movement effecting means including a single hydraulic cylinder and piston assembly coupled to said guide and fork such that said fork can be lowered to a negative elevation below the level of the first set of rails and can be raised to a positive elevation above the height of the tower assembly; and an operator cage coupled to the tower assembly for movement therewith, the cage being slidably coupled for vertical motion along the tower assembly and being operatively coupled to the fork for following motion of the fork when the fork is in a positive elevation and for being retained on said support assembly when said fork is in a negative elevation.

* * * * *